June 18, 1940.  R. J. WITTMER  2,204,953
RESILIENT CAR WHEEL
Filed Jan. 11, 1937  3 Sheets-Sheet 1
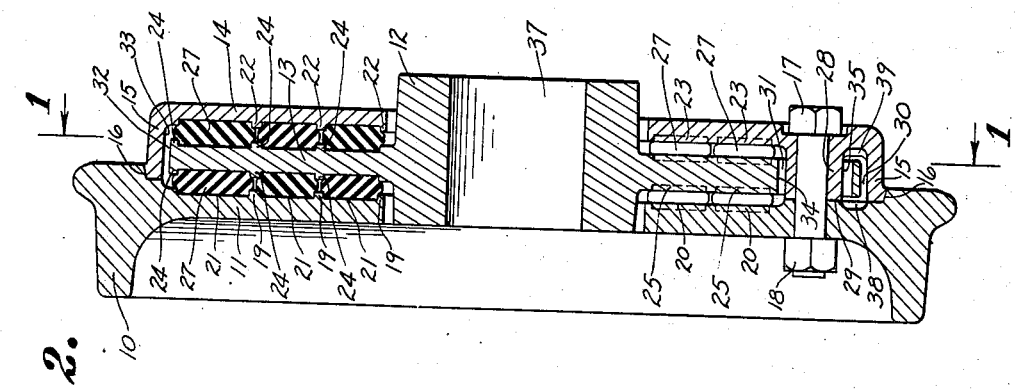
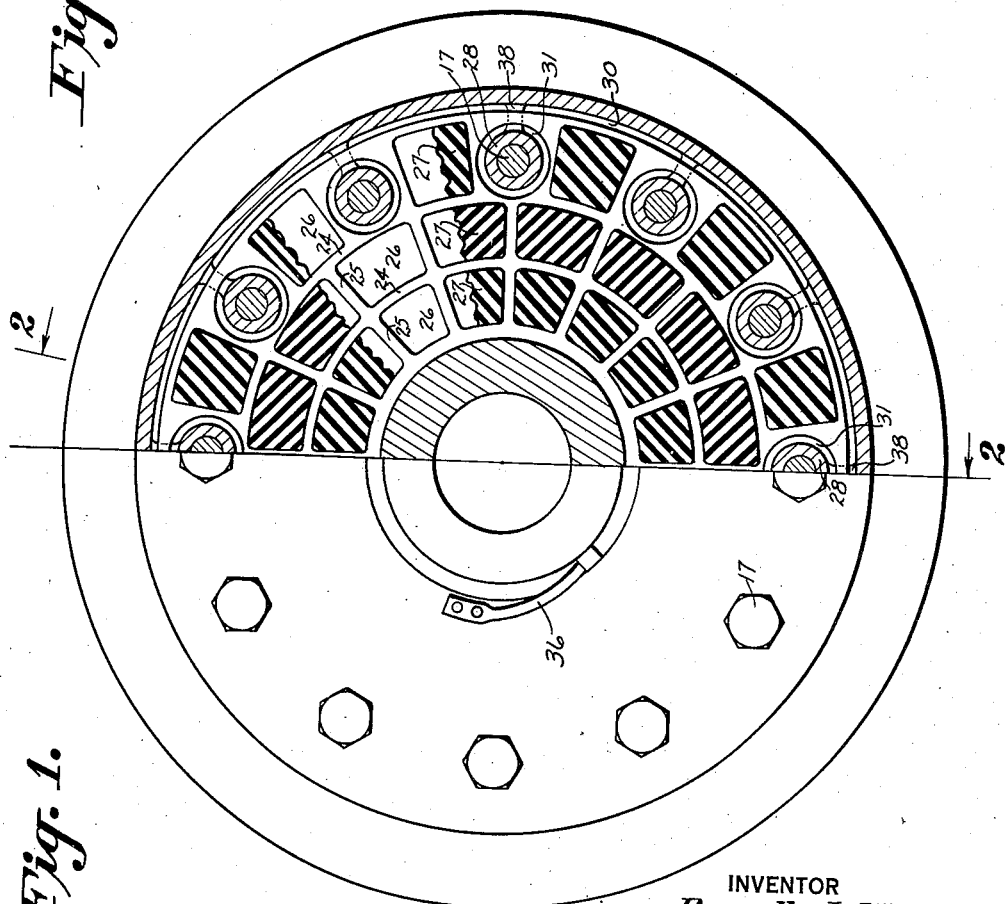
INVENTOR
Russell J. Wittmer
BY Clarence D. Kerr
ATTORNEY June 18, 1940.    R. J. WITTMER    2,204,953
RESILIENT CAR WHEEL
Filed Jan. 11, 1937    3 Sheets-Sheet 2

INVENTOR
*Russell J. Wittmer*
BY *Clarence D. Kerr*
ATTORNEY

June 18, 1940.  R. J. WITTMER  2,204,953
RESILIENT CAR WHEEL
Filed Jan. 11, 1937  3 Sheets-Sheet 3

INVENTOR
Russell J. Wittmer
BY Clarence D. Kerr
ATTORNEY

Patented June 18, 1940

2,204,953

UNITED STATES PATENT OFFICE 2,204,953

RESILIENT CAR WHEEL

Russell J. Wittmer, Cleveland Heights, Ohio, assignor to National Malleable and Steel Castings Company, Cleveland, Ohio, a corporation of Ohio Application January 11, 1937, Serial No. 119,940

8 Claims. (Cl. 295—11)

This invention relates to car wheels and more particularly a railway car wheel in which the tread and hub portions are separated by resilient material and are thereby capable of cushioning movement relative to each other.

It has long been a problem in such a wheel to provide sufficient rubber properly applied to carry the loads imposed and still obtain enough deflection to cushion shocks and absorb vibrations without transmitting such shocks or vibrations to the car body. It is an object of my invention to provide a plurality of concentric rows of rubber blocks held between parts of the hub and tread portions of the wheel in such a manner as to provide resiliency by compression of the rubber to cushion shocks and loads when applied axially of the wheel, and by shear stresses in the rubber to cushion shocks and loads when applied circumferentially and radially thereof. It is well known that continued rubbing between rubber and metal rapidly chews the contacting surface of the rubber, thereby soon rendering it unserviceable. Furthermore, where a single plate of rubber or at least a large volume is used in a wheel the internal heat developed by constant reversal of stresses therein cannot readily be dissipated and the rubber rapidly deteriorates.

By using a large number of comparatively small rubber blocks in my wheel, I eliminate any rubbing action between the rubber and metal parts since each block acts independently and does not subject adjacent blocks to stresses such as would tend to produce relative movement between such adjacent blocks and the metal parts. Moreover, the greater surface area of the separate blocks and the air spaces therebetween permits internal heat in the rubber to be more rapidly dissipated.

A further object of my invention is a wheel in which the surfaces thereof contacting the rubber do not have to be machined and hence the assembled wheel is less expensive and easier to manufacture.

Another object of my invention is the provision of means to transfer the load from portions of rubber subject to a high stress to other blocks of rubber in which the stress is not so great. Moreover, I provide means to definitely limit the amount of relative radial, axial and circumferential movement between the tread and hub members of the wheel so as to prevent overloading and damage to the rubber. Further objects and advantages of my invention will be more apparent from the following description taken in conjunction with the drawings, in which:

Figure 1 is a view partly in elevation and partly in vertical section, the latter being taken on line 1—1 of Fig. 2.

Figure 2 is a transverse sectional view taken on line 2—2 of Fig. 1.

Figure 4:
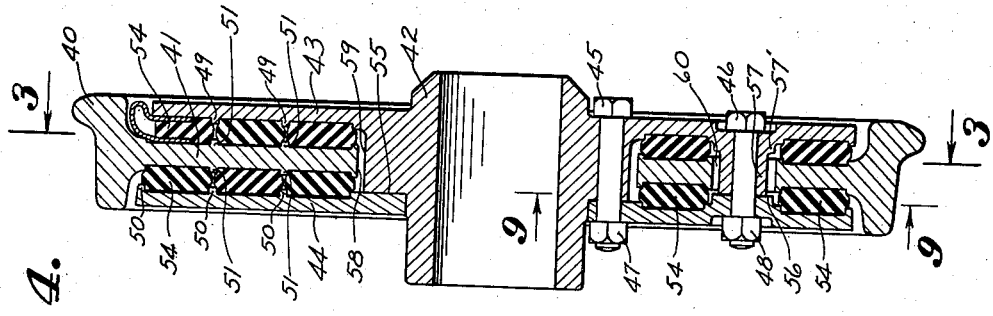
Figure 4 is a transverse vertical sectional view taken on line 4—4 of Fig. 3.

Referring to Figs. 1 and 2 there is shown a wheel provided with a tread portion 10 having an inwardly extending annular flange or plate 11, and a hub portion 12 provided with an outwardly extending flange 13 spaced from flange 11. On the opposite side of flange 13 from flange 11 and spaced from the former is a member 14 having an inturned flange 15 seated in a circumferential groove 16 of tread portion 10. Member 14 is held in groove 16 and against movement relative to the tread portion by means of bolts 17 and nuts 18 which extend through suitable openings in flange 11 and member 14.

Flange 11 is provided on its side facing flange 13 with circumferential ribs 19 and radially extending ribs 20 forming pockets 21. Similarly, member 14 is formed with circumferential ribs 22 and radial ribs 23 which likewise form pockets therebetween. Flange 13 is provided on each side with circumferential ribs 24 spaced from but directly opposite ribs 19 on flange 11 and ribs 22 on member 14, and is also provided with radially extending ribs 25 opposite the corresponding ribs on members 11 and 14, that with ribs 23 form pockets 26. Mounted in the pockets thus formed by the above-mentioned ribs, are rubber blocks 27 arranged in a plurality of spaced concentric circles. These blocks, when flange 15 is seated in groove 16 are under compression which causes the parts of the rubber not confined in the pockets to flow into the spaces between the ribs, as clearly illustrated in Fig. 2.

Member 14 is formed with a plurality of studs or bosses 28 each surrounding one of bolts 17 and adapted to engage the end of a stud or boss 29 on flange 11 at the same time that flange 15 is seated in groove 16. To provide for radial movement of hub portion 12 relative to tread portion 10 of the wheel, flange 13 is made slightly smaller in outside diameter than the inner diameter of flange 15, thereby leaving clearance, as at 30, permitting the aforesaid relative movement. Likewise, openings 31 are formed in flange 13 of sufficient size to permit the desired relative movement. Openings 31 also permit a limited amount of torsional movement of the hub relative to the tread. Clearances between the parts are arranged such that when they are completely taken up by contact between outer surface 32 of flange 13 with inner surface 33 of flange 15, and contact between surfaces 34 of openings 31 with outer surfaces 35 of bosses 28, the stress in the rubber will not exceed a predetermined amount such as would be harmful thereto.

In addition to the above described means for limiting radial and circumferential movement between the tread and hub members, I provide means for limiting axial movement between these members in the form of ribs 38 spaced from the sides of member 13 and joining bosses 29 with portions of the tread member radially outward thereof. Similar ribs 39 on the opposite side of member 13 extend between bosses 28 and flange 15 of member 14. It will be apparent that axial movement of either the tread or hub member relative to the other will be limited by contact between ribs 38 or 39 and flange 13.

The initial compression in the rubber blocks produced by tightening up nuts 18 is adequate to hold the blocks in contact with adjacent surfaces on the wheel even when a load is imposed such as would produce shearing stresses in the blocks and cause the greatest amount of relative movement between the hub and tread portions. However, I prefer to use the circumferential and radial ribs on the members so that the blocks may be readily and accurately spaced and thus permit a more rapid assembly of parts. The blocks may either be made separate from one another, or tied together during the process of molding by a thin web of rubber whereby the assembly operation may be even more readily accomplished. Such a web of rubber however, would have no effect on the operation of the wheel, it being merely for the purpose of assembling. The tread and hub portions may be joined by the usual bond 36 to complete the electric circuit between these members.

The above described wheel is particularly adaptable for use on existing cars wherein the journal extends through an opening 37 and projects beyond the hub portion into the usual journal box. In such case there is not sufficient room on the outer side of the wheel for the resilient mounting and the wheel is therefore constructed in the manner shown with the flange 13 and member 14 on the inner side of the wheel.

Figure 3:
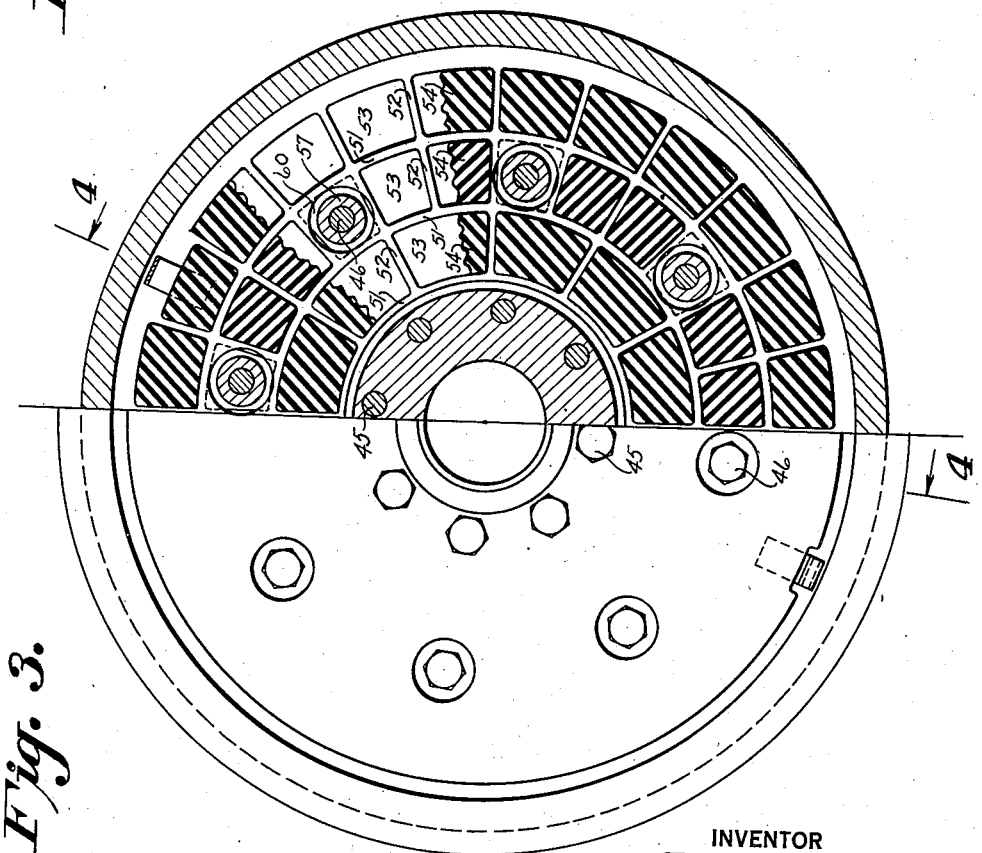
Figure 3 is a view of another form of my invention partly in plane and partly in vertical section, the latter being taken on line 3—3 of Fig. 4.

In Figs. 3 and 4 there is illustrated a wheel adapted for use on cars which do not require offsetting the rubber unit to accommodate interfering parts of the associated truck. In such instance, a slightly different construction embodying the same principles as described in connection with Figs. 1 and 2 is used.

Referring particularly to Figs. 3 and 4 there is shown a wheel having a tread portion 40 provided with a centrally disposed inwardly extending flange or plate 41, and a hub member 42 having an integral flange 43 spaced from flange 41. On the opposite side of flange 41 from flange 43 is a member 44 joined with hub member 42 by means of concentric rows of bolts 45 and 46 which bolts are provided with nuts 47 and 48 respectively. Flange 43 and member 44 have circumferential ribs 49 and 50, respectively, which are joined by radial ribs in the same manner as shown and described in Figs. 1 and 2. Likewise, flange 41 is formed on each side with circumferential ribs 51 joined by radial ribs 52 forming pockets 53 similar to the corresponding pockets in the previous figures. Rubber blocks 54 are positioned in the various pockets between flange 41, flange 43 and member 44. In assembling this wheel, nuts 47 are drawn up until member 44 engages a surface 55 on hub 42. At the same time nuts 48 are tightened until boss 56 on member 44 engages boss 57 on flange 43. At this time the rubber is under a predetermined amount of initial compression. It will be appreciated that bolts 45 and 46 and the corresponding nuts join member 44 rigidly with hub member 42 so that the two act as a single unit. Relative radial movement between the tread and hub is provided by maintaining clearance between inner surface 58 of flange 41 and the adjacent surface 59 on the hub member. Openings 60 in flange 41 are sufficiently large so that the clearance between the outer walls of these openings and the outer surface of boss 57 is substantially the same as the aforementioned clearance between surfaces 58 and 59.

Figure 9:
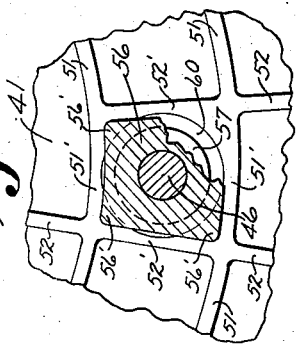
Figure 9 is a partial sectional view taken on line 9—9 of Fig. 4, the rubber blocks not being shown.

In the form of invention shown in Figs. 3 and 4 I have provided a slightly different method of limiting axial movement between the tread and hub members. This may be best understood by particular reference to Fig. 9 which shows a portion of member 41 in the neighborhood of one of the bosses 57. The rubber blocks have been omitted from this figure for purposes of clarity. It will be observed that the ribs 51' and 52' surrounding opening 60 extend to the edge of the opening, the outer surfaces of ribs 51' and 52' being in the same vertical plane. Boss 56 instead of being cylindrical is of the same general shape as one of the rubber blocks, the size of this being such that the corners 56' overlap the junctions of ribs 51' and 52. Boss 56 is normally spaced from the ribs on member 41, as illustrated in Fig. 4. However, upon sufficient relative axial movement between the tread and hub members, the ribs on member 41 will engage the overlapping portions of boss 56 to limit such axial movement. While this arrangement for limiting axial movement has been illustrated and described in connection with boss 56, it will be understood that the portion 57' of boss 57 may be constructed in a similar manner so as to engage portions of ribs 51 and 52 on the opposite side of member 41 than is shown in Fig. 9.

Figure 8:
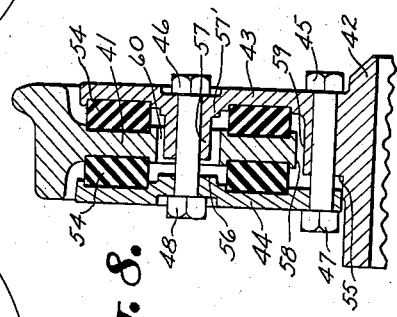
Figure 8 is a partial sectional view of the wheel shown in Figs. 3 and 4 with the parts in position but before the nuts have been drawn tight to place the rubber under initial compression.

Fig. 8 serves to illustrate the position of the parts of the wheel shown in Figs. 3 and 4 before the nuts are drawn tight to compress the rubber. It will be noted that the rubber blocks are substantially rectangular in cross-section before they are initially compressed and, as shown in Fig. 4, tightening of the nuts causes the rubber to flow radially into the spaces between the flanges on the hub and tread members. It will be appreciated that the rubber will also flow in a circumferential direction.

Figure 7:
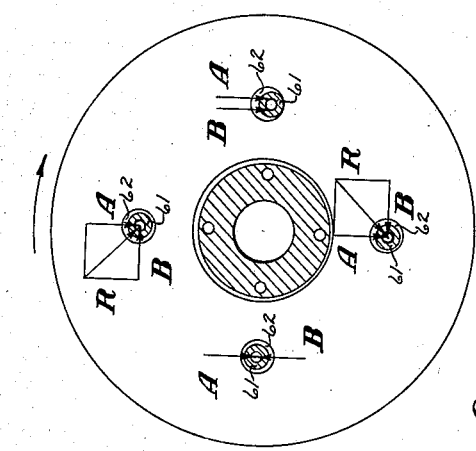
Figure 7 is a diagrammatic view showing the direction of the forces and relative movement when the wheel is subjected to combined vertical and torsional loads.
Figure 6:
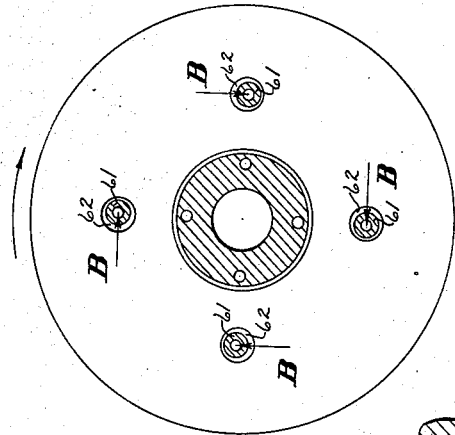
Figure 6 is a view similar to Fig. 5 but showing the relative movement when the wheel is subjected to torsional loads.
Figure 5:
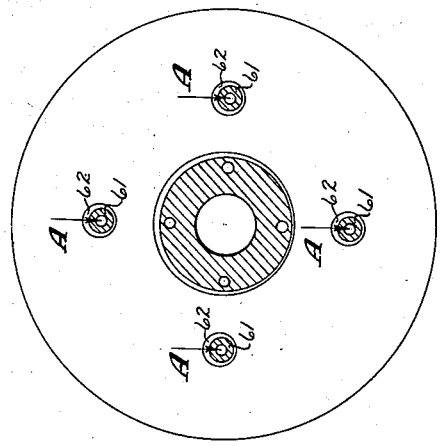
Figure 5 is a diagrammatic illustration of the relative movement between the tread and hub portions of my wheel when subjected only to a vertical load.

In addition to serving as stops to prevent overloading the rubber, bosses 28 and 57 comprise means for equalizing the stress in the various rubber blocks by transferring load from points of high stress to points of lower stress. In Figs. 5, 6 and 7 are found diagrammatic illustrations of the major stresses to which the rubber is subjected in my wheel. Reference numeral 61 indicates a series of bosses spaced about the wheel similar to bosses 28 of Figs. 1 and 2 or bosses 57 of Figs. 3 and 4, and numeral 62 refers to the opening in the portion of the wheel surrounding the boss and corresponds to similar openings in the previous figures. While only four bosses are shown in Figs. 5, 6 and 7 for purposes of illustration, it will be understood that a greater number may be used without departing from the principle to be described. In Fig. 5 the arrows A indicate the summation of vertical loads placed on the rubber, as a result of which the hub member has been deflected somewhat relative to the tread member but not sufficient to cause the bosses 61 to engage the lower side of openings 62. Fig. 6 illustrates the relation of the tread and hub members when only a torque load B is applied to the rubber sufficient in amount to partially deflect the bosses 61 in the openings 62. Fig. 7 shows the instantaneous application of both vertical and torque loads in such amounts that at the right-hand side of the figure the addition of loads A and B causes boss 61 to contact the wall of opening 62. Diametrically opposite, that is, on the left-hand side of Fig. 7, it will be observed that loads A and B are in opposite directions, thereby, in part, counteracting each other, depending on the relative intensity of the two loads. At the top and bottom of the figure the resultant R of forces A and B in each case is at an angle to the direction of the individual loads.

It will be observed that although forces have been applied such as to cause contact between one of the bosses and the wall of its opening there are still clearances in other places which permit the hub member to rotate about the contacting boss so as to still provide for relative cushioning movement between the hub and tread members. It will therefore be apparent that although combinations of loads may be applied to cause contact between one of the stops on the hub and tread members such contact will not necessarily impair the cushioning effect of the wheel. After contact of one of the bosses any additional load is transferred to parts of the rubber where the resultant of forces has caused it to be less highly stressed. This transfer of load is accomplished through a lever arm the mechanical advantage of which depends upon the position of the rubber in the wheel and the direction of the resultant of the forces therein, for instance, in the rubber diametrically opposite the contacting boss the load is transferred through a lever arm having a one to two ratio; that is, the load is applied at the center of the wheel and tends to rotate the hub member relative to the tread member about the contacting boss through a lever arm equal to the distance from the center of the wheel to the boss, and this load is resisted by the rubber diametrically opposite the contacting boss by a lever arm equal to the distance between the bosses.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A car wheel comprising tread and hub portions, a flange extending from one of said portions towards the other and a pair of flanges extending from said other portion on each side of and spaced from said first named flange, rubber means between said flanges and acting in shear for opposing relative movement between said tread and hub portions, and stop means on one of said flanges adjacent said tread portion and projecting through another of said flanges for limiting relative radial and circumferential movement of said portions.

2. A car wheel comprising tread and hub portions, a flange extending from one of said portions towards the other and a pair of flanges extending from said other portion on each side of and spaced from said first named flange, rubber means between said flanges and acting in shear for opposing relative movement between said tread and hub portions, stop means on one of said flanges adjacent said tread portion and projecting through another of said flanges for limiting relative radial and circumferential movement of said portions, and means adjacent said stop means for limiting relative axial movement between said portions.

3. A car wheel comprising tread and hub portions, radial flanges on said portions extending into overlapping relation, a plate member engaging said hub portion and extending radially adjacent said tread flange, a plurality of rubber blocks between said flanges and acting in shear and said plate for cushioning relative movement between said tread and hub portions, and means comprising a member extending between said hub flange and said plate and through said tread flange for limiting movement between said portions in radial, axial and circumferential directions.

4. A car wheel comprising a tread member having an inwardly extending flange, a hub member having a flange spaced from said tread member flange, resilient means between said flanges and acting in shear for opposing relative movement between said members, and projecting means on one of said flanges adapted to cooperate with the other of said flanges and constructed and arranged to transfer load from portions of said resilient means subjected to a predetermined maximum stress to other portions of said resilient means in which the stress is a lesser amount.

5. A car wheel comprising tread and hub portions, radial flanges extending from said portions into overlapping relation with each other, a plurality of rubber blocks between said flanges and acting in shear for opposing relative movement between said portions, and projecting means on one of said flanges intermediate certain of said blocks adapted to engage another of said flanges for limiting movement between said portions when the stress in any of said blocks reaches a predetermined maximum, said means being constructed and arranged so that when the stress in any block reaches said maximum additional loads are transferred to other blocks in which the stress is a lesser amount.

6. A car wheel comprising tread and hub members, a flange on each member spaced from and in overlapping relation to the flange on the other member, means for drawing said flanges toward each other into predetermined spaced relation, means for obtaining the maximum amount of rubber in the form of separate, independent, axially compressed blocks between said flanges and within the available space between said tread and hub members, said means comprising a plurality of rows of separate rubber blocks, the edges of each of said blocks being substantially parallel to and spaced from the adjacent edges of adjacent blocks, when not compressed, said spacing being only sufficient to allow each block to function independently of adjacent blocks when said flanges are drawn toward one another into said predetermined spaced relation.

7. A car wheel comprising a tread and hub, a pair of flanges extending radially from said hub, a flange extending from said tread inwardly between said hub flanges, a plurality of compressible rubber blocks between said flanges acting in shear for cushioning relative movement between said tread and hub, said tread flange having an opening therein, means on said hub flanges adjacent said opening extending toward said tread flange, said means being adapted to contact portions of said tread flange surrounding said opening to limit axial movement of said hub relative to said tread, and means extending from one of said hub flanges through said opening adapted to engage the other of said hub flanges to limit compression of said blocks upon assembly of the parts, said last named means being adapted to engage the walls of said opening to limit relative circumferential movement between said tread and hub.

8. A car wheel comprising a tread and hub, a pair of flanges extending radially from said hub, a flange extending from said tread inwardly between said hub flanges, a plurality of compressible rubber blocks between said flanges acting in shear for cushioning relative movement between said tread and hub, said tread flange having an opening therein, means on said hub flanges adjacent said opening adapted to contact portions of said tread flange surrounding said opening to limit relative axial movement between said tread and hub, and means extending from one of said hub flanges through said opening adapted to engage the other of said hub flanges to limit compression of said blocks upon assembly of the parts, said last named means having portions adapted to engage the walls of said opening to limit relative circumferential movement between said tread and hub.

RUSSELL J. WITTMER.